(12) United States Patent
Zhang et al.

(10) Patent No.: US 10,379,914 B2
(45) Date of Patent: Aug. 13, 2019

(54) SYSTEM AND METHOD FOR ACHIEVING SPECIFIC BEHAVIORS BY INTERCEPTING FILE ACCESS CALLS IN A MAINFRAME REHOSTING PLATFORM

(71) Applicant: Oracle International Corporation, Redwood Shores, CA (US)

(72) Inventors: Weixuan (Wade) Zhang, Beijing (CN); Zhaoyong Zhang, Beijing (CN); Wei (David) Pan, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 261 days.

(21) Appl. No.: 15/386,392

(22) Filed: Dec. 21, 2016

(65) Prior Publication Data
US 2017/0206119 A1  Jul. 20, 2017

Related U.S. Application Data

(60) Provisional application No. 62/280,811, filed on Jan. 20, 2016.

(51) Int. Cl.
*G06F 9/54* (2006.01)

(52) U.S. Cl.
CPC .................................. *G06F 9/541* (2013.01)

(58) Field of Classification Search
None
See application file for complete search history.

(56) References Cited

U.S. PATENT DOCUMENTS

| | | | |
|---|---|---|---|
| 5,678,044 A | 10/1997 | Pastilha | |
| 6,006,277 A | 12/1999 | Talati | |
| 8,010,582 B2 | 8/2011 | Zimowski | |
| 8,037,008 B2 | 10/2011 | Jung | |
| 8,539,488 B1 * | 9/2013 | Havemose | |
| 8,745,076 B2 | 6/2014 | Pazdziora | |
| 8,881,139 B1 | 11/2014 | Acacio | |
| 9,043,764 B2 | 5/2015 | Ranganathan | |

(Continued)

OTHER PUBLICATIONS

United States Patent and Trademark Office, Office Action dated Sep. 18, 2018 for U.S. Appl. No. 15/386,410, 12 Pages.

(Continued)

*Primary Examiner* — Syed A Roni
(74) *Attorney, Agent, or Firm* — Tucker Ellis LLP

(57) ABSTRACT

In accordance with an embodiment, described herein is a system and method for achieving specific behaviors by intercepting file access calls in a mainframe application rehosted in a mainframe rehosting platform. A custom file handler can include a custom version of each of a plurality of default file operation application program interfaces (APIs) available in the mainframe rehosting platform, and can be invoked by the rehosted mainframe application. Each custom file operation API can perform one of a plurality of specific behaviors comprising changing a file access mode, appending a specific data field at the end of each record or line of a file, and performing one or more special post-handling actions. If the rehosted mainframe application cannot detect the existence of a custom file handler, a file access call can be directed to one or more of the plurality of default file operations APIs.

20 Claims, 5 Drawing Sheets

(56) References Cited

U.S. PATENT DOCUMENTS

| | | |
|---|---|---|
| 9,430,505 B2 | 8/2016 | Padmanabhan |
| 9,934,258 B2 | 4/2018 | Fuglsang |
| 2007/0067771 A1 | 3/2007 | Kulbak et al. |
| 2010/0262970 A1* | 10/2010 | Havemose |
| 2012/0159427 A1 | 6/2012 | Oara |
| 2014/0068269 A1 | 3/2014 | Zhou |

OTHER PUBLICATIONS

Mark Rakhmilevich, Oracle® Mainframe Rehosting Leveraging Oracle Tuxedo: Accelerating Cost Reduction and Application Moderationization, Jun. 2008, Updated Mar. 2009, 37 pages.

George Eadon et al., "Supporting Table Partitioning by Reference in Oracle", SIGMOD '08, Jun. 9-12, 2008, Vancouver, BC, Canada, Copyright 2008, 12 Pages.

Oracle, "Oracle Tuxedo Application Runtime for Batch Reference Guide 12c Release 1 (12.1.1)", Sep. 2013, Copyright © 2010, 2013, 156 Pages.

Oracle, "Oracle Tuxedo Application Rehosting Workbench" Reference Guide 12c Release 2(12.1.3), Apr. 2014, Copyright © 2012, 2014, 500 pages.

* cited by examiner

SYSTEM AND METHOD FOR ACHIEVING SPECIFIC BEHAVIORS BY INTERCEPTING FILE ACCESS CALLS IN A MAINFRAME REHOSTING PLATFORM

CLAIM OF PRIORITY

This application claims the benefit of priority to U.S. Provisional Application titled "SYSTEM AND METHOD FOR INTERCEPTING FILE ACCESS TO ACHIEVE SPECIFIC BEHAVIOR IN A TRANSACTIONAL PROCESSING ENVIRONMENT", Application No. 62/280,811, filed Jan. 20, 2016, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and application rehosting, and are particularly related to a system and method for achieving specific behaviors by intercepting file access calls in a mainframe rehosting platform.

BACKGROUND

To reduce costs and become as agile as possible, organizations today are increasingly seeking to move business-critical mainframe applications to open systems and cloud environments. However, to do so can often imply complex, costly and resource-heavy application migration projects, which deter companies from undertaking such migrations. Over the years, mainframe application rehosting has become a preferred option for many organizations for modernizing their mainframe legacy systems.

However, a rehosted mainframe application may display different behaviors functionally due to one or more components used in a mainframe rehosting platform, and users may not want this type of different behaviors. Other times, users may want a rehosted application to have certain functionalities that are not available in the original application.

SUMMARY

In accordance with an embodiment, described herein is a system and method for achieving specific behaviors by intercepting file access calls in a mainframe application rehosted in a mainframe rehosting platform. A custom file handler can include a custom version of each of a plurality of default file operation APIs available in the mainframe rehosting platform, and can be invoked by the rehosted mainframe application. Each custom file operation API can perform one of a plurality of specific behaviors comprising changing a file access mode, appending a specific data field at the end of each record or line of a file, and performing one or more special post-handling actions. If the rehosted mainframe application cannot detect the existence of a custom file handler, a file access call can be directed to one or more of the plurality of default file operations APIs.

DETAILED DESCRIPTION

As companies face increasing pressure to deliver more business value from their IT spending and free up funding for new business initiatives, more and more companies are migrating their mainframe applications to open systems to reduce mainframe costs and to modernize legacy applications. Mainframe rehosting platforms, such as Oracle Tuxedo Application Runtimes (ART), can be used to simplify the migration.

Mainframe Rehosting Platform

Figure 1:
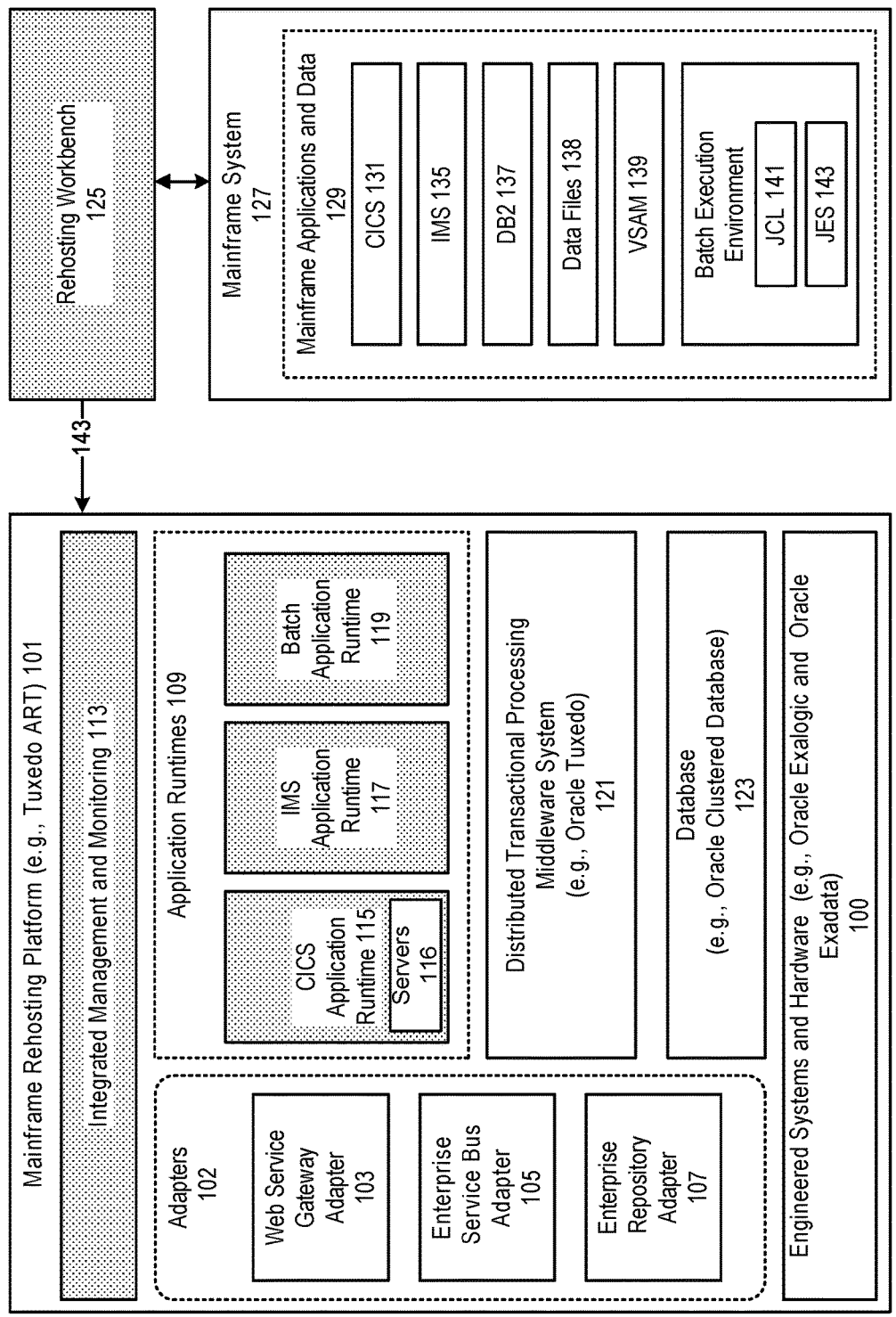
FIG. 1 illustrates an exemplary mainframe rehosting platform, in accordance with an embodiment.

FIG. 1 illustrates an exemplary mainframe rehosting platform, in accordance with an embodiment.

As shown in FIG. 1, a mainframe rehosting platform 101 and a rehosting workbench 125 can provide a system for rehosting mainframe applications and data 129 on lower-cost platforms without losing business value or sacrificing Quality of Service (QoS).

In accordance with an embodiment, the mainframe applications and data 129 to be rehosted can currently run on a mainframe system 127, for example, an IBM@ mainframe system; and can include a customer information control system (CICS) 131, an information management system (IMS) 135, a DB2 database 137, one or more data files (e.g., sequential files) 138, and a virtual storage access method (VSAM) file management system 139.

In accordance with an embodiment, the CICS and the IMS can be middleware products on the mainframe system. The CICS is a heavy and rigid transaction processing management system designed to support rapid, high-volume online transaction processing. The IMS is a light-weight message-based transaction processing management system. The middleware products can be used to host business logic written in common business-oriented language (COBOL), Programming Language/1 (PL/I), C, Assembly or Fourth-Generation Languages (4GLs). The VSAM can comprise different file organizations which can be used by application programs to manage their data. The file organizations can include key sequenced data set key (KSDS), relative record data set (RRDS), entry sequenced data set (ESDS), and linear data set (LDS).

In addition, the mainframe system 127 can include a batch execution environment 140 that can support JOB Control Language (JCL) 141 and a job entry subsystem (JES) 143. JCL can be a script language to implement batch processes on the mainframe system. JES can be a major component of an operating system on the mainframe system, can receive jobs into the mainframe system, schedule the jobs for processing, and control their output processing.

As further shown in FIG. 1, the mainframe rehosting platform can include a software stack compatible with the mainframe system to run mainframe applications with little to no change to minimize the risks and cost of migration; and an integrated management and monitoring component 113 for use in monitoring the mainframe rehosting platform. The software stack can provide a set of mainframe-compatible functionalities to preserve CICS, IMS, and batch application logic and data.

In accordance with an embodiment, the software stack can include a plurality of application runtimes (ART) 109 for hosting mainframe applications, for example, a CICS application runtime 115, an IMS application runtime 117, and a batch application runtime 119. The plurality of application runtimes and a rehosting workbench 125 can be used to migrate 143 the mainframe applications 129 from the mainframe system 127 to the mainframe rehosting platform 101.

In accordance with an embodiment, the CICS application runtime can include a set of system servers 116 to simulate core features of the mainframe CICS. The system servers 116 can provide underlying application server functions, including cluster management, request routing, health monitoring, restarts, failover, load balancing, transaction management, communication channels and gateways (ATMI, CICS, IMS, SOAP/HTTP web services, Java/JCA, .Net, ESB), and protocol conversion. The system servers 116 can be, for example, TUXEDO® system servers available from Oracle.

In accordance with an embodiment, the IMS application runtime can provide a set of DL/I calls for use by COBOL/C applications migrated from the mainframe system 127; a robust session environment to handle concurrent connections from a plurality of 3270 terminals; a robust execution environment to provide On-Line Transaction Processing (OLTP) to process transaction codes received from the 3270 terminals via calling the migrated COBOL/C applications; and a DB plug-in on the mainframe rehosting platform.

In accordance with an embodiment, the batch application runtime 119 can include a set of system servers 116 to simulate mainframe JES core features. For example, the batch application runtime can provide batch management and a plurality of JES functions (e.g., job queues, classes, priorities, and initiators).

In accordance with an embodiment, the rehosting workbench can be used to automate code and data migration using migration tools in the rehosting workbench. The code and data can include COBOL programs, copybooks, BMS screens, JCL, and DB2 DDL. The code and data can be transferred from the mainframe system 127 to the rehosting workbench, which can parse source objects, calculate dependencies, generate metadata, and produce reports to indicate any missing objects or unused ones in the code and data.

In accordance with an embodiment, after the code and data are parsed, data migration tools for files and DB2 tables can run, followed by code migration tools for COBOL JCL. The code migration tools can apply sophisticated language processing to adapt COBOL code between compiler dialects, transform JCL, adapt SQL calls for differences between DB2 and Oracle DB. For data migration, the data migration tools can generate target schemas, including Oracle DDL, in the mainframe rehosting platform 101, and can automate data reloading to the generated target schemas.

In accordance with an embodiment, the rehosting workbench can be used in UNIX command line mode, and an Eclipse IDE graphical environment; and can generate system configuration files for the mainframe rehosting platform to facilitate configuration management and to simplify the deployment process.

The software stack can execute on a distributed transactional processing middleware system 121, for example, Oracle Tuxedo. The distributed transactional processing middleware system can run on an open system environment, for example, UNIX, Linux, or Windows. The distributed transactional processing middleware system can include a native distributed architecture to provide transaction manager features for IMS and CICS from the perspective of applications.

In accordance with an embodiment, the distributed transactional processing middleware system can represent a transaction-oriented middleware, or an enterprise application server designed for high availability and to provide scalable applications to support transactions on various distributed systems.

Examples of the distributed transactional processing middleware system can include Tuxedo (Transactions for UNIX, Enhanced for Distributed Operation), a message-based communications system to distribute applications across various operating system platforms and databases.

Tuxedo allows messages to be queued to persistent or non-persistent storage (memory) for later processing or retrieval. An application-to-transaction monitor interface (ATMI) in Tuxedo can provide an interface that allows messages to be added to or read from queues. Tuxedo can pass service request messages between ATMI clients and servers through operating system (OS) inter-processes. In Tuxedo, requests are sent to named services, and Tuxedo uses memory based inter-process communication facilities to queue the requests to servers.

Rehosted mainframe applications can run as Tuxedo services, and can take advantage of SOA integration and enablement capabilities via a plurality of adapters 102, for example, a web service gateway adapter 103, an enterprise service bus (ESB) adapter 105, and an enterprise repository adapter 107.

In accordance with an embodiment, rehosted/migrated applications can be configured to expose a plurality of service interfaces in legacy components via standard Web Services Description Languages (WSDLs), and to provide robust bi-directional web services gateway capabilities. For example, the web service gateway adapter 103, an example of which can be Oracle Service Architecture Leveraging Tuxedo (SALT) adapter, can enable the rehosted applications to participate in SOA environments.

In addition, the rehosted applications can also use the ESB adapter 105 with built-in Tuxedo Transport for heterogeneous messaging. Web services and ESB end points can be imported into an enterprise repository via the enterprise repository adapter 107 to provide visibility, service dependency tracking, and other benefits of service lifecycle governance.

As further shown in FIG. 1, in accordance with an embodiment, the distributed transactional processing middleware system can execute on an engineered system and hardware 100, such as Oracle Exalogic and Oracle Exadata; and can include a clustered database 123, such as Oracle REAL Application Clusters. The clustered database can support usage of multiple individual systems as one clustered, virtual database server; and can provide transparent synchronization of read and write accesses to databases shared by all nodes in a cluster, dynamic distribution of database workload, and transparent protection against systems failures.

In accordance with an embodiment, the system described above, by combining a distributed transactional processing middleware system, a clustered database, an engineered system, and a plurality of open system products, can provide required reliability, availability, scalability and performance to rehosted mainframe applications.

Definitions of Terms

In accordance with an embodiment, the following terms are used throughout the document.

COBOL: In accordance with an embodiment, COBOL, short for common business-oriented language, is a procedural programming language designed for business use in mainframe computers.

Job Control Language (JCL): In accordance with an embodiment, JCL is a command language used in mainframe computers (e.g., IBM mainframe computers). JCL identifies programs to be executed, inputs required, and location for the inputs and output; and informs an operating system through job control statements. In a mainframe environment, programs can be written COBOL, C or another programming language, and can be executed in batch and online modes. JCL can be used to submit a program for execution in a batch mode.

Datasets: In accordance with an embodiment, datasets are mainframe files with records organized in a specific format. Datasets are stored on a direct access storage device (DASD) or tapes in a mainframe system. If a dataset is required to be used/created in a batch program, the physical name of a file (i.e., dataset) along with a file format and organization can be coded in a JCL. The definition of each dataset used in a JCL can be given using a data definition (DD) statement. The input and output resources required by a job step in JCL can be described within a DD statement, with information such as the dataset organization, storage requirements and record length.

DISP: In accordance with an embodiment, DISP, short for standards for Disposition of the Dataset, is a parameter of a DD statement, which can be used to describe the status of the dataset, disposition at the end of the job step on normal and abnormal completion.

Custom File Handler

In accordance with an embodiment, the system and method described herein can provide a custom file handler for use in achieving specific behaviors in a mainframe rehosting platform.

In accordance with an embodiment, the custom file handler can include a custom version of each of a plurality of default file operation APIs available in the mainframe rehosting platform, and can be invoked by a rehosted mainframe application. Each custom file operation API can perform one of a plurality of specific behaviors comprising changing a file access mode, appending a specific data field at the end of each record or line of a file, and performing one or more special post-handling actions. If the rehosted mainframe application cannot detect the existence of a custom file handler, a file access call can be directed to one or more of the plurality of default file operations APIs.

In accordance with an embodiment, the system can be used to intercept file access calls (system calls or runtime library calls) from a rehosted mainframe application, and can inject special processing operations to the intercepted file access calls. The interception and injection are transparent to the rehosted mainframe application, which does not receive any indication that the file access calls (e.g., open, read, write, and close) have been intercepted and modified.

The interception and injection can be implemented in an application runtime container for executing the rehosted mainframe application.

In accordance with an embodiment, the custom file handler can be implemented using a plurality of programming languages. If it is implemented in C, the custom file handler can be implemented as an individual shared library.

In accordance with an embodiment, to intercept a file access call, a system-provided default runtime library can be shortcut, so that the custom file handler can be called before the system-provided default runtime library.

Within the custom file handler, each file operation API, for example, fopen( ) and fwrite( ), can be rewritten. Each rewritten file operation API, after intercepting a file access call, can add one or more special file operations to the intercepted file access call, either before or after, or both before and after, the intercepted file access call is forwarded to a corresponding default file operation API.

In accordance with an embodiment, more than one custom file handlers can be provided based the needs of the rehosted mainframe application.

Compared with the existing solution which requires writing new contents to a temporary file and then concatenating the original file and the temporary file to generate a full file, the system and method described uses a custom file hander to intercept file access calls, to check whether the DISP is in a MOD mode. If it is, the custom file handler can change the MODE open mode to "APPEND" silently, and then forwards the modified file access call to a corresponding default file access API.

As a result, behaviors of a rehosted mainframe application can remain unchanged, and specific program behaviors can be achieved, without modifying any code in the rehosted mainframe application to accommodate platform and system differences.

Figure 2:
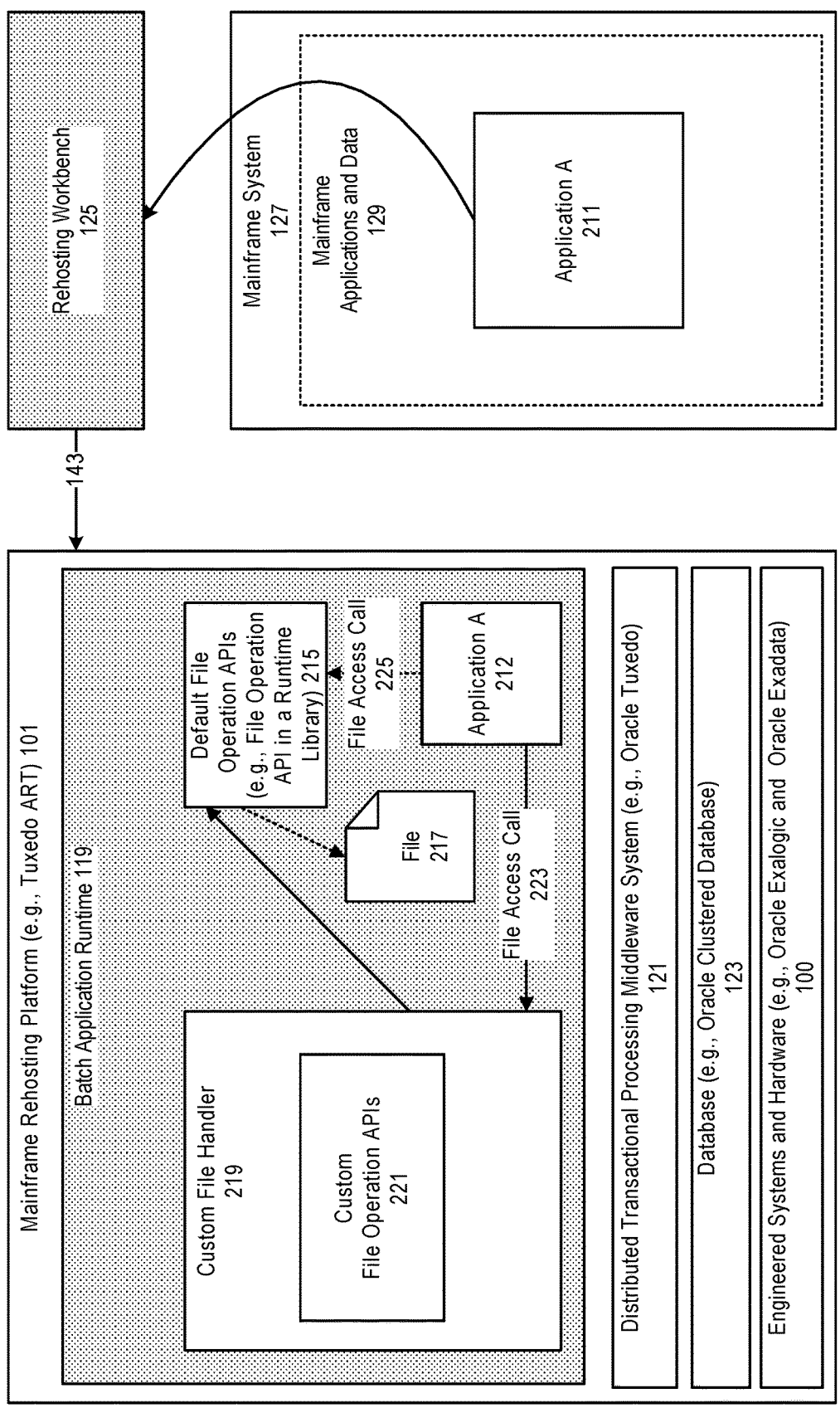
FIG. 2 illustrates a system for intercepting file access calls to achieve specific behaviors in a mainframe rehosting platform, in accordance with an embodiment.

FIG. 2 illustrates a system for intercepting file access calls to achieve specific behaviors in a mainframe rehosting platform, in accordance with an embodiment.

As shown in FIG. 2, the mainframe rehosting platform 101 can include a custom file handler 219 in the batch application runtime 119. The custom file handler can include a plurality of custom file operation APIs 221, each of which can have a corresponding version in a plurality of default file operation APIs 215, which can be included in a runtime library in the batch application runtime, or a system library on the mainframe rehosting platform 101.

In accordance with an embodiment, a custom file operation API and its corresponding default file operation API can have the same name. Inside each custom file operation API, one or more specific behaviors can be added to an intercepted file access call. Example specific behaviors include changing a file access mode, appending a specific data field at the end of each record or line of a file, and performing one or more special post-handling actions. For example, after completing a file operation, a custom file operation can notify a user of the completion through email. This and other special requirements related to file operations may not be supported by the file system itself on the mainframe rehosting platform.

As further shown in FIG. 2, in accordance with an embodiment, Application A 211 on the mainframe system 127 can be migrated through the rehosting workbench 125 to the batch application runtime 119 on the mainframe rehosting platform 101.

In accordance with an embodiment, the rehosted Application A 212 can be recompiled with a particular compiling option, so that the rehosted Application A can be aware of the existence of the custom file handler 219 at runtime, to direct a file access call 223 for accessing a file 217 to the custom file handler.

In accordance with an embodiment, if the rehosted application A cannot detect the existence of the custom file hander, a file access call can be automatically directed to a default corresponding file operation API.

From the perspective of the custom file handler, the custom file handler can intercept a file access call, inject one or more special processing operations, and then call a corresponding default file operation API for processing the file access call.

As such, in accordance with an embodiment, when a custom file handler can be detected by the rehosted application A, a file access call from the rehosted application A can be successively processed, first by the custom file handler, and then by one of the plurality of default file operation APIs.

The custom file handler can modify the behavior of a file access operation requested by the file access call, so that when the file access call is eventually directed to the default file operation API, the file access call can be processed in a manner that it was processed on the mainframe system, or can generate one or more special process operations as described above, such as notifying a user of the completion of a file access operation.

Figure 3:
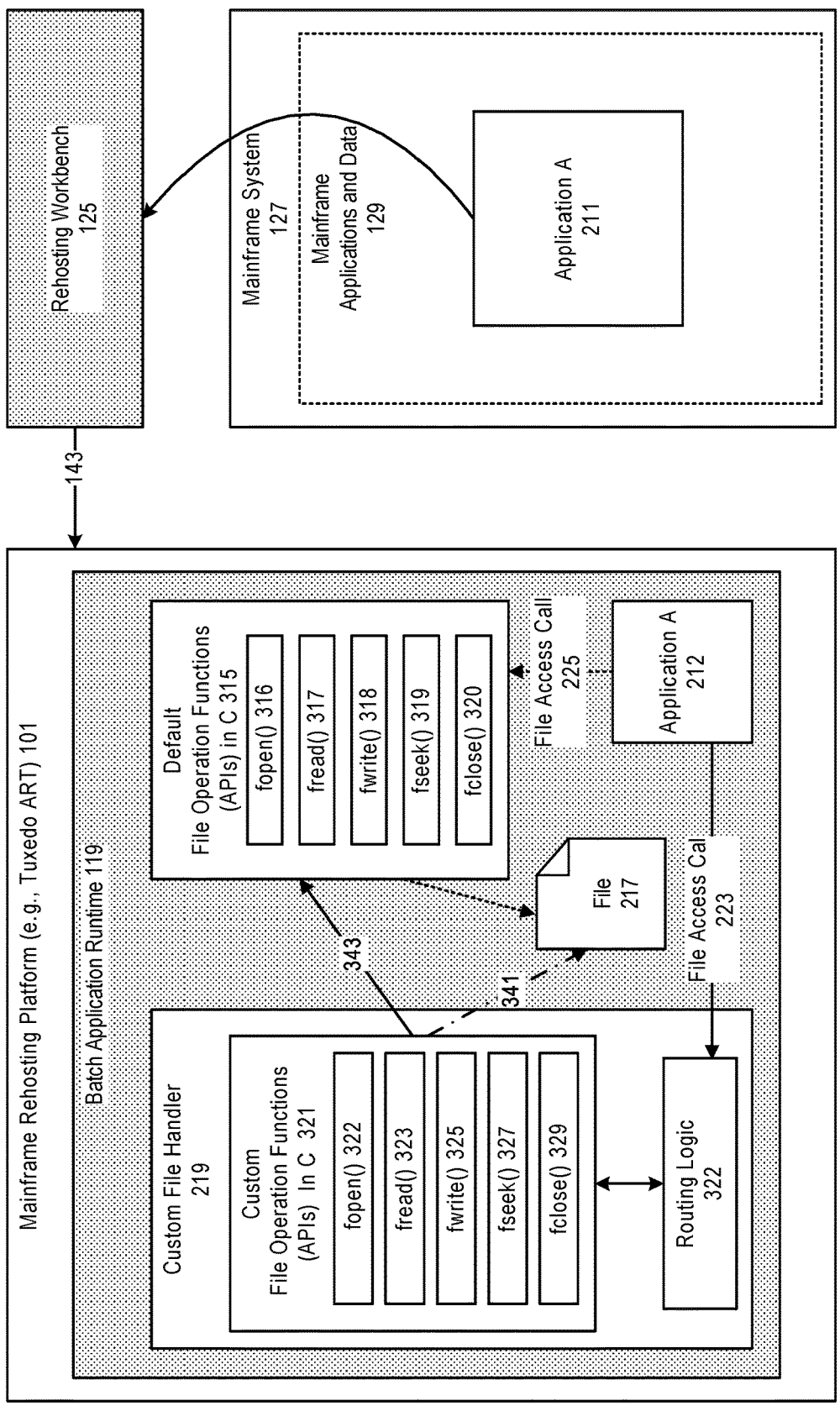
FIG. 3 further illustrates a system for intercepting file access calls to achieve specific behaviors in a mainframe rehosting platform, in accordance with an embodiment.

FIG. 3 further illustrates a system for intercepting file access calls to achieve specific behaviors in a mainframe rehosting platform, in accordance with an embodiment.

As shown in FIG. 3, the batch application runtime 119 can include a plurality of default file operation functions (i.e. APIs) 315 in C programming language, for example, a fopen( ) 316, a fread( ) 317, a fwrite( ) 318, a fseek( ) 319, and a fclose( ) 320; and a set of corresponding custom file access functions 321 in C programming language, including a fopen( ) 322, a fread( ) 323, a fwrite( ) 325, a fseek( ) 327, and a fclose( ) 329.

In accordance with an embodiment, the custom functions and the default functions have the same function names. The custom file operation functions can modify one or more attributes/parameter values of an intercepted file access call, and can redirect the modified file access call to a corresponding default file operation function for further processing.

In an alternative embodiment, the custom file handler can include all the functionalities provided by the plurality of default file operation functions 315, thereby eliminating the need of redirecting an intercepted file access call.

For example, each custom file operation function can include all the functionalities of the corresponding default file operation function, in addition to performing one or more specific behaviors described above.

In accordance with an embodiment, the custom file handler can include custom versions for only a subset of the default file operation functions, based on the needs of the rehosted application, a user, or a business entity. The needs can also determine what special processing operations can be included in the custom versions.

In accordance with an embodiment, the custom file handler can include an algorithm in a routing logic 322 for preprocessing a file access call.

For example, the routing logic can determine whether a file operation function requested by an intercepted file access call exists in the custom file handler. If it does not, the routing logic can redirect 343 the file access call to a corresponding default file operation function. If it does, the routing logic can further determine whether the file operation function is configured to only modify one or more parameter values and/or adds one or more special processing operations to an intercepted file access call.

If the file operation function only modifies parameter values and/or adds special processing operations, the routing logic can redirect 343 the modified file access call to a corresponding file operation function for further processing.

However, if the file operation function includes all the functionalities provided by a corresponding default file operation function, the custom file handler can directly use the corresponding custom version to operate 341 on the file 217.

Figure 4:
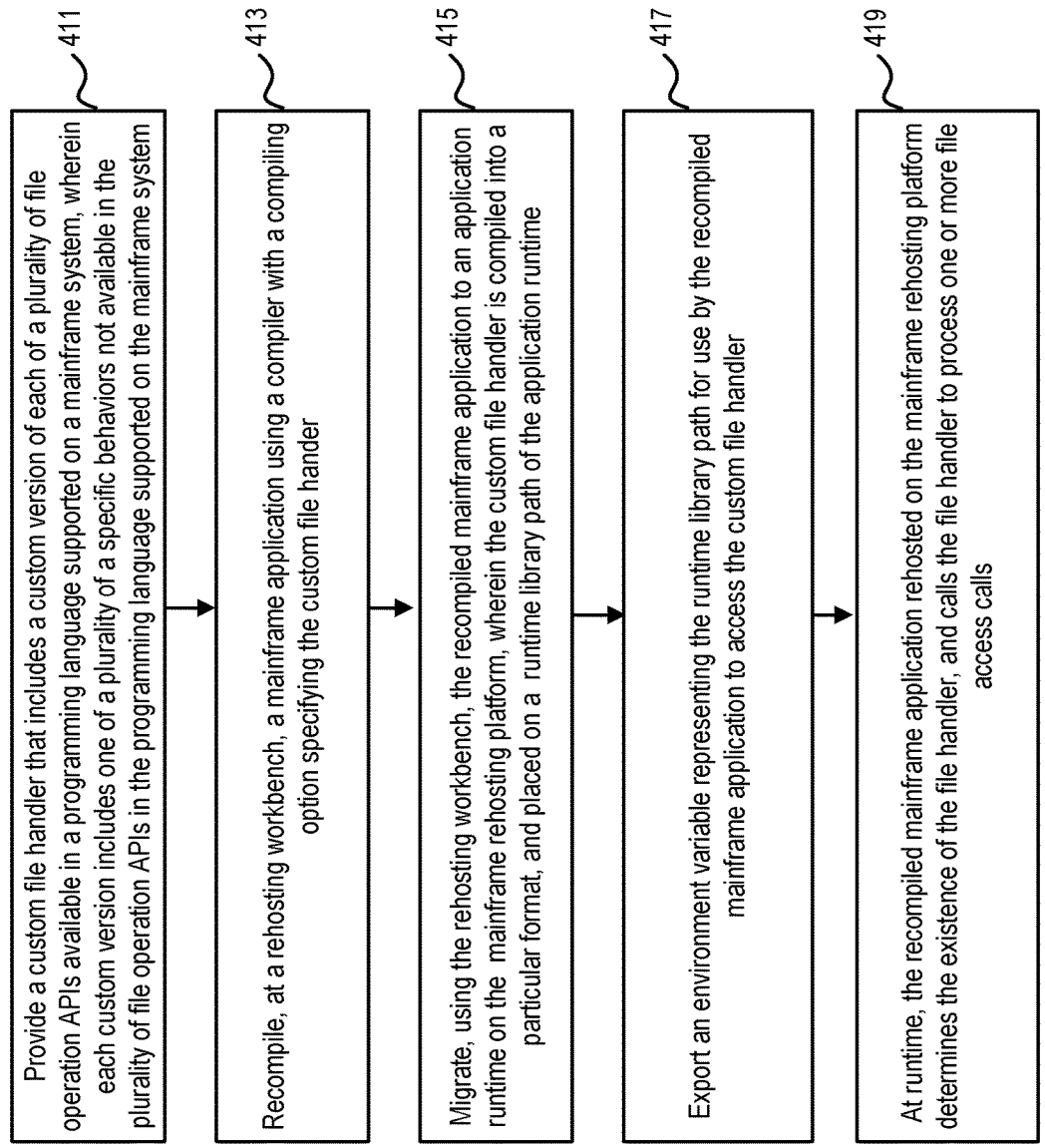
FIG. 4 illustrates integrating a custom file handler into a mainframe rehosting platform, in accordance with an embodiment.

FIG. 4 illustrates integrating a custom file handler into a mainframe rehosting platform, in accordance with an embodiment.

In accordance with an embodiment, at step 411, a custom file handler that includes a custom version for each of a plurality of file operation APIs available in a programming language supported on a mainframe system is provided, wherein each custom version includes one of a plurality of a specific behaviors not available in the plurality of file operation APIs in the programming language supported on the mainframe system.

At step 413, a mainframe application is recompiled at a rehosting workbench, using a compiler with a compiling option specifying the custom file hander.

At step 415, the recompiled mainframe application is migrated to an application runtime on the mainframe rehosting platform for rehosting using the rehosting workbench, wherein the custom file handler is compiled into a particular format, and placed on a runtime library path of the application runtime.

At step 417, an environment variable representing the runtime library path is exported, so that the application runtime has access to the environmental variable to access the custom file handler.

At step 419, at runtime, the recompiled mainframe application rehosted on the mainframe rehosting platform determines the existence of the file handler, and calls the file handler to process one or more file access calls.

Figure 5:
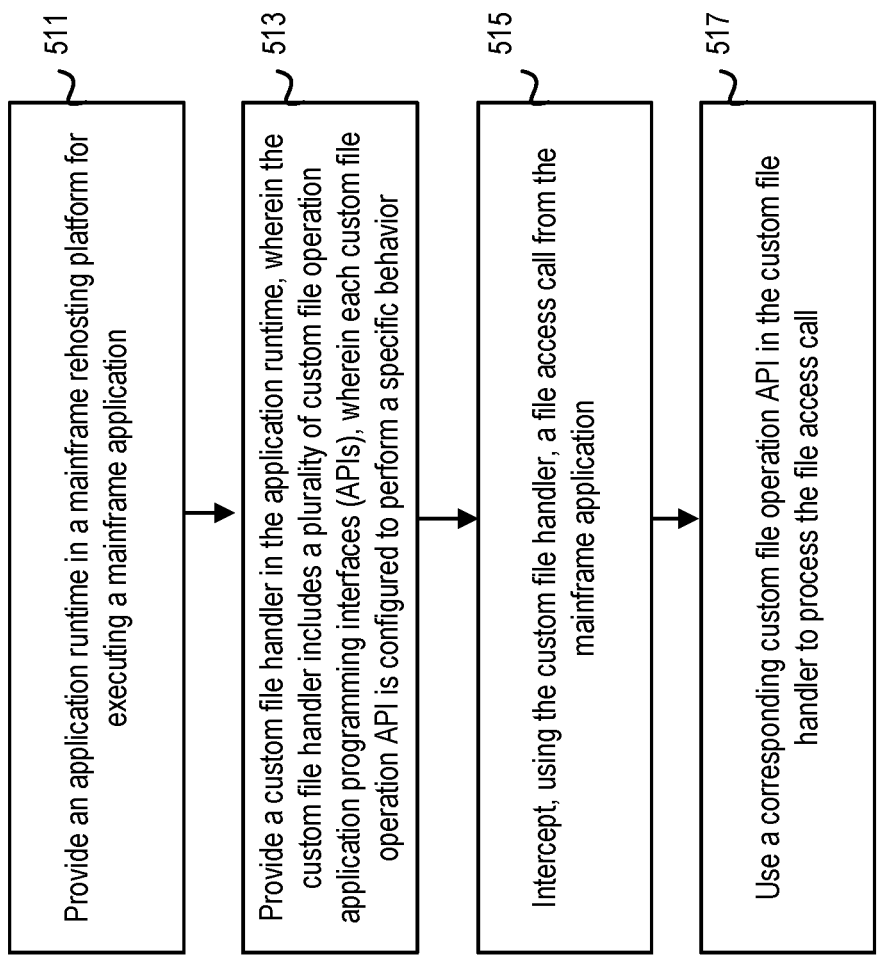
FIG. 5 illustrates a method for intercepting file access calls to achieve specific behaviors in a mainframe rehosting platform, in accordance with an embodiment.

FIG. 5 illustrates a method for intercepting file access calls to achieve specific behaviors in a mainframe rehosting platform, in accordance with an embodiment.

As shown in FIG. 5, in accordance with an embodiment, at step 511, an application runtime in a mainframe rehosting platform for executing a mainframe application is provided.

At step 513, a custom file handler in the application runtime is provided, wherein the custom file handler includes a plurality of custom file operation application programming interfaces (APIs), wherein each custom file operation API is configured to perform a specific behavior.

At step 515, a file access call from the mainframe application is intercepted by the custom file handler.

At step 517, the custom file handler uses a corresponding custom file operation API to process the file access call.

Example Implementation

In accordance with an embodiment, JCL DISP attribute can affect the COBOL file open mode on a mainframe computer.

For example, for "OPEN OUTPUT" in a COBOL program, with DISP=OLD, "OPEN OUTPUT" in COBOL program, a WRITE operation can overwrite existing data in a file; with DISP=MOD, the WRITE operation can append contents to existing data at the end of a file.

A mainframe program that uses JCL DISP attributes to open a file can maintain the above-described behavior if the mainframe program executes on a mainframe computer that includes an IBM JCL subsystem and a MicroFocus COBOL runtime, as the IBM JCL subsystem and the Micro Focus COBOL Runtime can be used in combination to simulate this behavior on the mainframe computer.

However, a batch application runtime in the Oracle Tuxedo ART mainframe rehosting platform may use its own batch runtime spawner as its JCL subsystem, and use Micro Focus COBOL as its runtime system. This working pair may not support the above-described behavior automatically.

For a rehosted mainframe application in the batch application runtime, DISP attributes are ignored, and a WRITE operation is to overwrite whenever it is opened with "OUTPUT" mode, regardless the DISP attributes.

Since it is hard to change Micro Focus COBOL Runtime behaviors, the exemplary implementation is provided to modify the batch runtime spawner (EJR system) of the batch application runtime to address the problem As shown below, an external file handler (custom file handler) can be provided to change default operation behaviors of file access operations.

The external file handler can be written in COBOL, C, or other programming languages. In this implementation, COBOL is used, since the mainframe rehosted application that calls the external file handler is written in COBOL.

In this implementation, an external file handler is a COBOL program compiled into a .gnt file using a COBOL compiler.

The calling COBOL program (rehosted main application) can be notified of the existence of the external file handler. To get the notification, the calling COBOL program can be recompiled with a compiling option specifying the external file handler. The compiling option can be added to a compiler configuration file, or placed on a compiler command line.

For a Micro Focus compiler, the following compiling option can be used:
CALLFH("ARTEXTFH")

For a Micro Focus compiler, the following compiling option can be used:
Sequential and Relative file
flat-extfh=ARTEXTFH
flat-extfh-lib="ARTEXTFH.gnt"

Listing 1 shown below shows sample code that can be included in the external file handler to change "OUTPUT" open mode to "EXTEND" for all line-sequential and sequential datasets, and forward all other dataset operations to a default handler.

---

Listing 1

---

```
if file-type in ['Sequential', 'Line sequential']
and file-disp is 'MOD'
and file-open-mode = 'OUTPUT'
then
    file-open-mode = 'EXTEND'
call default-file-handler
```

---

In the function described in Listing 1 above, the "file-disp" needs to be exported by the batch application runtime (BatchRT), and its name should bind with a DD name. ARTEXTFH (external file handler) can get the "file-disp" from a current environment variable.

The ART File Handler can be compiled into a .gnt file ARTEXTFH.gnt, and placed into BatchRT runtime library path, as show below:
art12110/Batch_RT/ejr/COBOL_MF/ARTEXTFH.gnt  #
    for Micro Focus
art12110/Batch_RT/ejr/COBOL_IT/ARTEXTFH.gnt  #
    for COBOL-IT The following environmental variables need to be exported into the application runtime environment, so that a caller program can find the file handler and load it into memory:
export COBPATH=$COBPATH:
$BATCHHOME/art12110/Batch_RT/ejr/COBOL_MF
exportLD_LIBRARY_PATH=$LD_LIBRARY_PATH:
BATCHHOME/art12110/Batch_RT/ejr/COBOL_CIT The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for achieving specific behaviors in a rehosted mainframe application, the system comprising:
   a microprocessor;
   a mainframe rehosting platform executing on the microprocessor, wherein the mainframe rehosting platform comprises an application runtime for executing a mainframe application migrated from a mainframe computer; and
   a custom file handler in the application runtime, wherein the custom file handler comprises a plurality of custom file operation application programming interfaces (APIs), wherein each custom file operation API is configured to perform a specific behavior;
   wherein the custom file handler is configured to intercept a file access call from the mainframe application migrated from a mainframe computer, and use a corresponding custom file operation API in the custom file handler to process the intercepted file access call, wherein the custom file handler is compiled in a particular format, and placed on a runtime library path of the application runtime, wherein an environmental variable representing the runtime library path is exported, for use by the rehosted mainframe application to detect an existence of the custom file handler.

2. The system of claim 1, wherein the specific behavior is one of changing a file access mode, appending a specific data field at the end of each record of a file, or performing one or more special post-handling actions.

3. The system of claim 1, wherein each of the plurality of custom file operation APIs in the custom file handler is configured to call a corresponding default file operation API.

4. The system of claim 3, wherein each custom file operation API is configured to add a specific behavior to the file access call either:
before the corresponding default file operations API are invoked,
after the corresponding default file operations API are invoked, or
both before and after the corresponding default file operations API are invoked.

5. The system of claim 1, wherein the mainframe application comprises a mainframe application recompiled with a compiling option specifying the custom file handler.

6. The system of claim 1, wherein the custom file handler is a common business-oriented language (COBOL) program compiled into a .gnt file.

7. The system of claim 1, wherein the custom file handler is written in C or common business-oriented language (COBOL).

8. The system of claim 1, wherein the mainframe rehosting platform is based on a transactional platform executing on engineered hardware, and comprises a clustered database.

9. The system of claim 1, wherein the custom file handler is implemented as a C shared library.

10. A method for achieving specific behaviors in a rehosted mainframe application executing on a microprocessor, the method comprising:
providing an application runtime in a mainframe rehosting platform for executing a mainframe application migrated from a mainframe computer;
providing a custom file handler in the application runtime, wherein the custom file handler comprises a plurality of custom file operation application programming interfaces (APIs), wherein each custom file operation API is configured to perform a specific behavior, wherein the custom file handler is compiled in a particular format and placed on a runtime library path of the application runtime, wherein an environmental variable representing the runtime library path is exported for use by the rehosted mainframe application to detect an existence of the custom file handler;
intercepting, using the custom file handler, a file access call from the mainframe application migrated from a mainframe computer; and
using a corresponding custom file operation API in the custom file handler to process the intercepted file access call.

11. The method of claim 10, wherein the specific behavior is one of changing a file access mode, appending a specific data field at the end of each record of a file, or performing one or more special post-handling actions.

12. The method of claim 10, wherein each of the plurality of custom file operation APIs in the custom file handler is configured to call a corresponding default file operation API.

13. The method of claim 12, wherein each custom file operation API is configured to add a specific behavior to the file access call either:
before the corresponding default file operations API are invoked,
after the corresponding default file operations API are invoked, or
both before and after the corresponding default file operations API are invoked.

14. The method of claim 10, wherein the mainframe application comprises a mainframe application recompiled with a compiling option specifying the custom file handler.

15. The method of claim 10, wherein the custom file handler is a common business-oriented language (COBOL) program compiled into a .gnt file.

16. The method of claim 10, wherein the custom file handler is written in C or common business-oriented language (COBOL).

17. The method of claim 10, wherein the mainframe rehosting platform is based on a transactional platform executing on engineered hardware, and comprises a clustered database.

18. The method of claim 10, wherein the custom file handler is implemented as a C shared library.

19. A non-transitory computer readable storage medium, including instructions stored thereon which when read and executed by one or more computers cause the one or more computers to perform a method comprising:
providing an application runtime in a mainframe rehosting platform for executing a mainframe application migrated from a mainframe computer;
providing a custom file handler in the application runtime, wherein the custom file handler comprises a plurality of custom file operation application programming interfaces (APIs), wherein each custom file operation API is configured to perform a specific behavior, wherein the custom file handler is compiled in a particular format and placed on a runtime library path of the application runtime, wherein an environmental variable representing the runtime library path is exported for use by the rehosted mainframe application to detect an existence of the custom file handler;
intercepting, using the custom file handler, a file access call from the mainframe application migrated from a mainframe computer; and
using a corresponding custom file operation API in the custom file handler to process the intercepted file access call.

20. The non-transitory computer readable storage medium of claim 19, wherein the specific behavior is one of changing a file access mode, appending a specific data field at the end of each record of a file, or performing one or more special post-handling actions.

* * * * *